US006921096B2

(12) United States Patent
Yang

(10) Patent No.: US 6,921,096 B2
(45) Date of Patent: Jul. 26, 2005

(54) VEHICLE STEERING SYSTEM HAVING RACK BAR SUPPORTING APPARATUS

(75) Inventor: Kwang-Ho Yang, Wonju (KR)

(73) Assignee: Mando Corporation, Kyunggi-do (KR)

( * ) Notice: Subject to any disclaimer, the term of this patent is extended or adjusted under 35 U.S.C. 154(b) by 57 days.

(21) Appl. No.: 10/284,019

(22) Filed: Oct. 30, 2002

(65) Prior Publication Data

US 2003/0193154 A1 Oct. 16, 2003

(30) Foreign Application Priority Data

Apr. 13, 2002 (KR) .......................................... 2002-20214

(51) Int. Cl.[7] .................................................. B62D 3/12
(52) U.S. Cl. ..................................... 280/93.514; 74/422
(58) Field of Search ........................ 280/93.514, 93.515; 180/400, 427, 428, 431, 432; 74/422, 498

(56) References Cited

U.S. PATENT DOCUMENTS

| | | | | |
|---|---|---|---|---|
| 3,908,479 A | * | 9/1975 | MacDuff | 74/498 |
| 4,215,591 A | * | 8/1980 | Bishop | 74/422 |
| 4,322,986 A | * | 4/1982 | Adams et al. | 74/89.18 |
| 4,581,952 A | * | 4/1986 | Yabe | 74/498 |
| 4,724,717 A | * | 2/1988 | Chikuma | 74/498 |
| 5,671,637 A | * | 9/1997 | Joerg et al. | 74/422 |
| 5,983,742 A | * | 11/1999 | Morris et al. | 74/422 |
| 6,119,540 A | * | 9/2000 | Phillips | 74/422 |

* cited by examiner

Primary Examiner—David R. Dunn
(74) Attorney, Agent, or Firm—R. Neil Sudol; Henry D. Coleman; William J. Sapone

(57) ABSTRACT

The present invention discloses a vehicle steering system having a rack bar supporting apparatus which prevents the rotation of a rack bar and makes the rack bar supporting apparatus compact by providing a plurality of rack bar supporting apparatuses installed at the rear of the rack bar to support the rack bar in the direction of a pinion gear. The vehicle steering system comprises a pinion shaft having a pinion gear on the outer circumference and being installed within a housing; a rack bar being located within the housing so that it can cross the pinion shaft and having a rack gear meshing with the pinion gear at one side of the middle part; and rack bar supporting apparatus provided on the rear surface of the rack bar for elastically supporting the rack bar in the direction of the pinion shaft, wherein a plurality of the rack bar supporting apparatuses are provided to vary the supporting direction and supporting force for supporting the rack bar.

9 Claims, 3 Drawing Sheets

[Fig.1] Prior Art
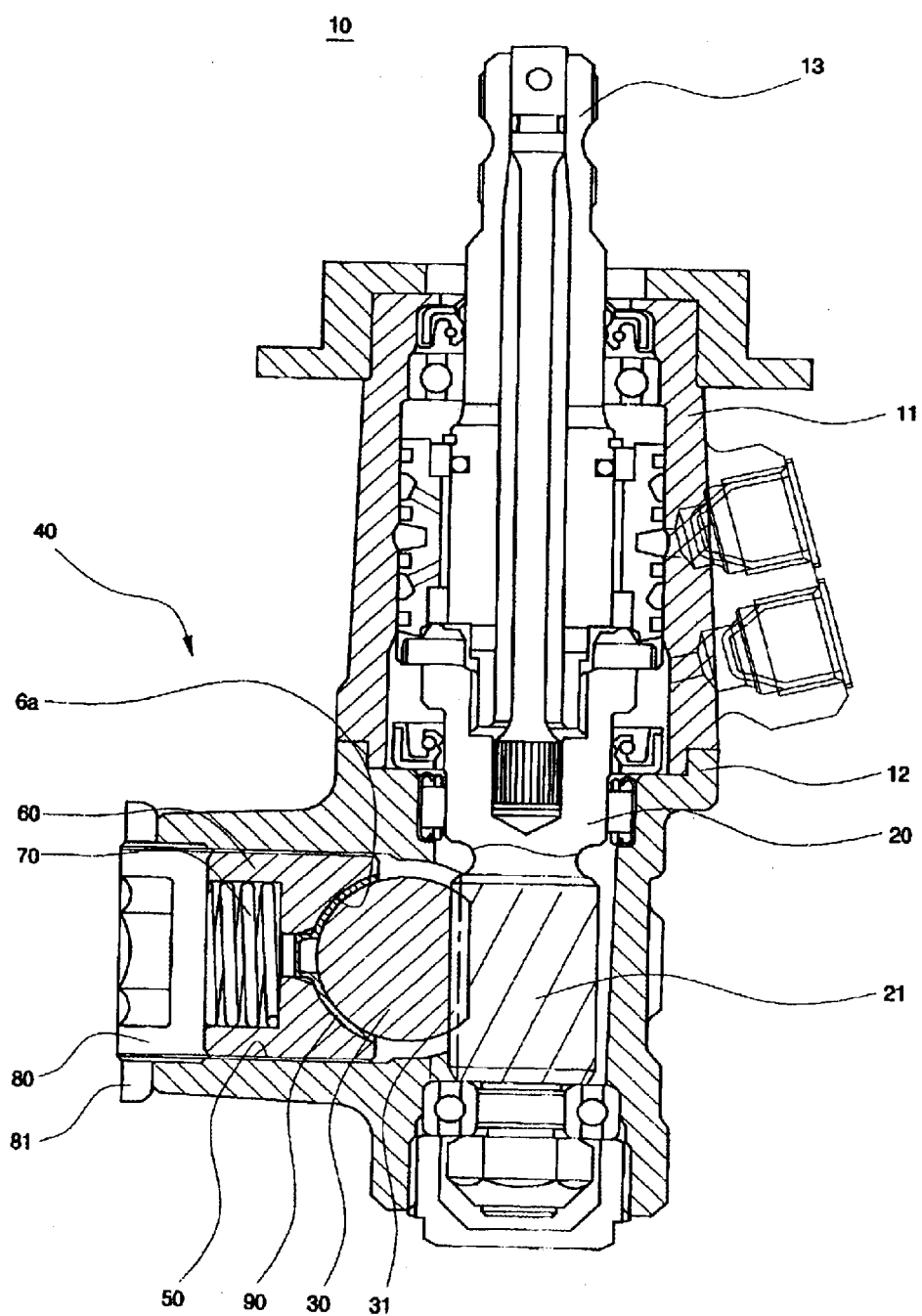

[Fig.2]
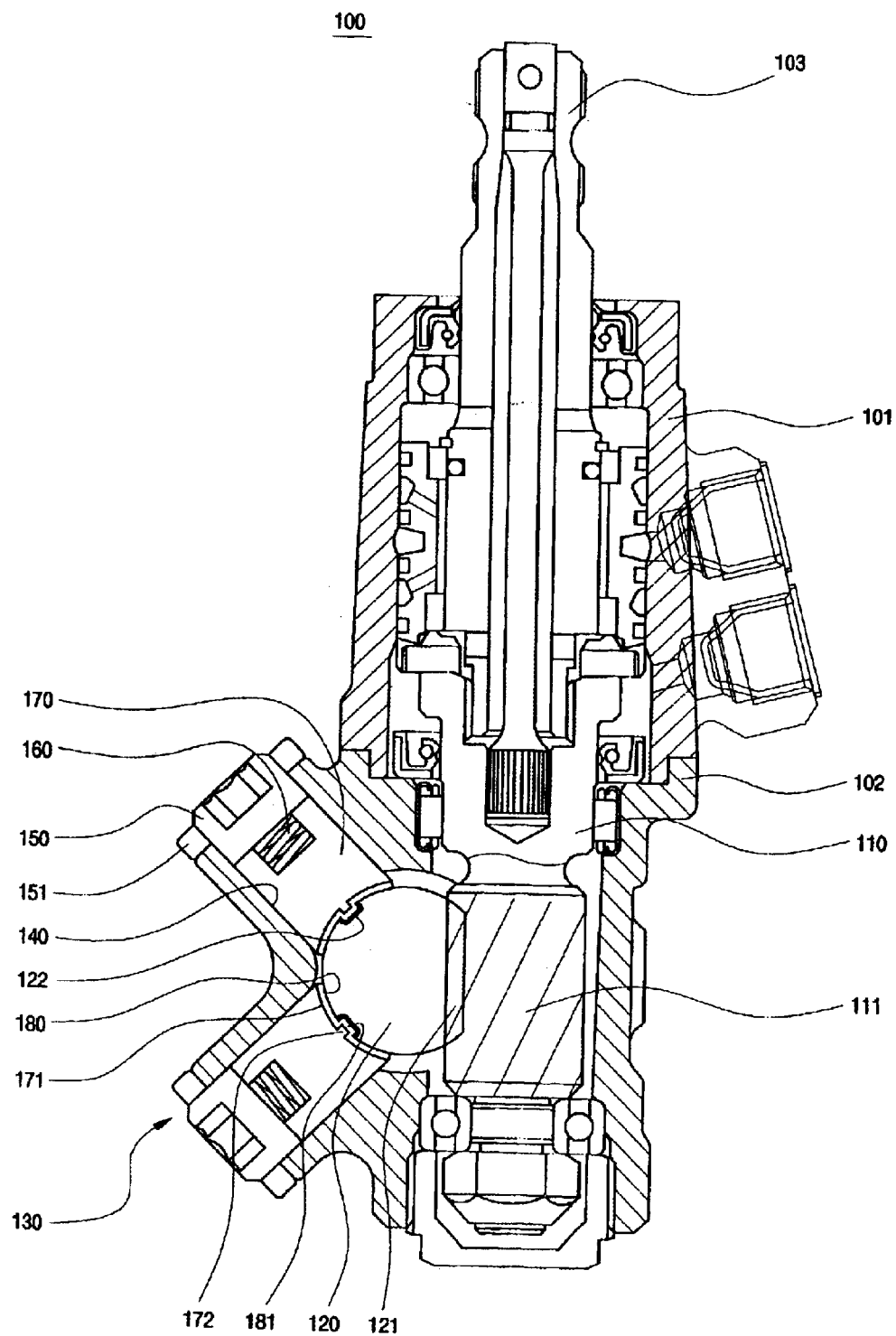

[Fig.3]
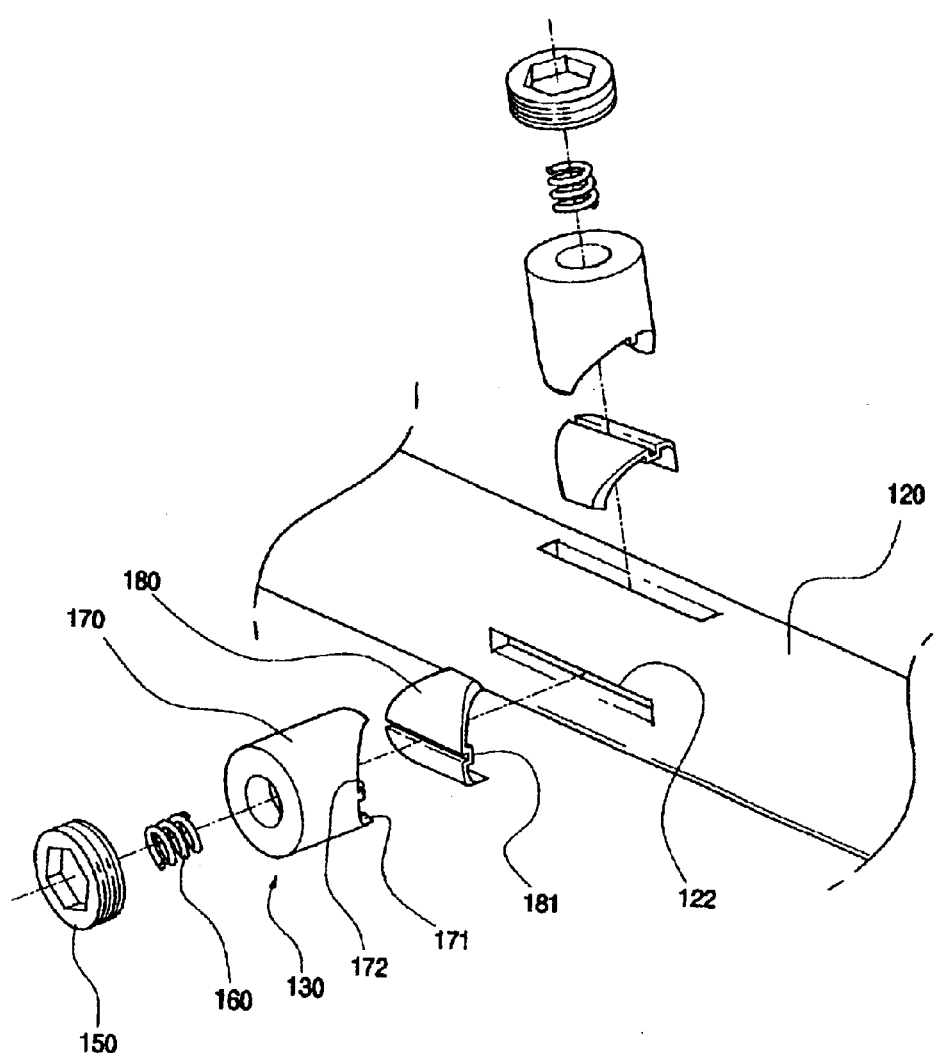

VEHICLE STEERING SYSTEM HAVING RACK BAR SUPPORTING APPARATUS

BACKGROUND OF THE INVENTION

1. Field of the Invention

The present invention relates to a vehicle steering system having a rack bar supporting apparatus, and more particularly, to a vehicle steering system having a rack bar supporting apparatus which prevents the rotation of a rack bar and makes the rack bar supporting apparatus compact by providing a plurality of rack bar supporting apparatuses for elastically supporting the rack bar in the direction of a pinion shaft so that a rack gear formed at the rack bar can be engaged with a pinion gear formed at the pinion shaft.

2. Description of the Related Art

Typically, a vehicle steering system is provided in order to change the traveling direction of a vehicle according to the operation of a driver. The vehicle steering system includes a steering wheel provided at a driver's seat, a steering shaft provided at the lower side thereof, and a gear box being linked with the steering shaft and changing the power transmission direction.

Meanwhile, the gear box includes warm sector type, warm sector roller type, ball-and-nut type, rack-and-pinion type, etc. Among them, the rack-and-pinion type gear box transmits power to a wheel through a pinion gear being rotated from the actuating force generated by a driver and a rack gear contacted with one side of the outer circumference.

FIG. 1 is a cross sectional view showing a conventional rack-and-pinion type gear box. As illustrated therein, the gear box 10 mainly includes a housing 12 provided at the lower end and a rotary valve 11 installed at the upper end so that it can be coupled to the housing 12.

Firstly, inside of the rotary valve 11 is installed an input shaft 13 rotatable with a rotary force generated by a driver. At the lower end of the input shaft 13 is installed a pinion shaft 20 that is connected to the input shaft 13 to be interlocked therewith and has a pinion gear 21 at the outer circumference.

Next, inside the housing 12 is installed a rack bar 30 as a round bar extended in the axial direction, the rack bar 30 having a rack gear 31 which has teeth meshing with the teeth of the pinion gear 21 at one side of the middle of the rack bar 30. At the rear of the rack bar 30, a rack bar supporting apparatus 40 is provided in order to elastically support the rack bar 30 in the direction of the pinion gear 21.

The rack bar supporting apparatus 40 includes a hollow yoke cylinder 50 formed integral with the housing 12 at the rear of the rack gear 31 and a support yoke 60 slidably inserted into the yoke cylinder 50 and having a hemi-circular groove for securely contacting to the rear surface of the rack bar 30.

At the rear of the support yoke 60, a coil type spring 70 is installed so that the support yoke 60 can press the rack bar 30. At the front end of the outer portion of the yoke cylinder 50, a yoke plug 80 is connected and fixed by a screw so that it can support one end of the spring 70.

In addition, at the outer circumference of the yoke plug 80 is installed a lock nut 81 for fixing the yoke plug 80 to the front end of the outer portion of the yoke cylinder 50. Between the support yoke 60 and the rack bar 30, a yoke seat 90 formed of a sheet metal is placed to be tightly contacted with them.

However, in the thusly constructed conventional rack bar supporting apparatus for the vehicle steering system, since the supporting force of the support yoke operates only in one direction of the rear surface of the rack bar, the supporting force is not sufficient, thus making the rack bar rotatable in the circumferential direction.

That is, in a case that there occurs a torsion of the rack bar by the rotation in the circumferential direction because the supporting force operates in only one direction and there is no device for preventing the rotation of the rack bar, an excessive clearance is generated between the pinion gear and the rack gear. This generates noise and abnormal abrasion.

SUMMARY OF THE INVENTION

Therefore, it is an object of the present invention to provide a vehicle steering system having a rack bar supporting apparatus which prevents the rotation of a rack bar and makes the rack bar supporting apparatus compact by providing a plurality of rack bar supporting apparatuses installed at the rear of the rack bar to support the rack bar in the direction of a pinion gear.

In accordance with the present invention a vehicle steering system comprises a pinion shaft having a pinion gear on the outer circumference and being installed within a housing; a rack bar being located within the housing so that it can cross the pinion shaft and having a rack gear meshing with the pinion gear at one side of the middle part; and rack bar supporting apparatus provided on the rear surface of the rack bar for elastically supporting the rack bar in the direction of the pinion shaft, wherein a plurality of the rack bar supporting apparatuses are provided to vary the supporting direction and supporting force for supporting the rack bar.

BRIEF DESCRIPTION OF THE DRAWINGS

The above objects, features and advantages of the present invention will become more apparent from the following detailed description when taken in conjunction with the accompanying drawings, in which:

FIG. 1 is a cross sectional view of a gear box showing a conventional rack bar supporting apparatus;

FIG. 2 is a cross sectional view of a gear box showing a rack bar supporting apparatus according to the present invention; and FIG. 3 is an exploded perspective view showing the rack bar supporting apparatus according to the present invention;

DETAILED DESCRIPTION OF THE PREFERRED EMBODIMENT

A preferred embodiment of the present invention will now be described with reference to the accompanying drawings.

FIG. 2 is a cross sectional view of a gear box showing a rack bar supporting apparatus according to the present invention; and FIG. 3 is an exploded perspective view showing the rack bar supporting apparatus according to the present invention.

As illustrated therein, a gear box 100 of a steering system is provided by connecting to the upper and lower sides a rotary valve 101 with an input shaft 103 mounted therewithin and a housing with a rack bar 120 mounted therewithin.

At the lower end of the input shaft 103 is installed a pinion shaft 110 having a pinion gear 111 at the outer circumference. Within the housing 102 is installed the rack bar 120 having a rack gear 121, the rack gear having teeth meshing with the teeth of the pinion gear 111 at one side of the middle of the rack bar 120.

Meanwhile, at the rear of the rack bar 120, a rack bar supporting apparatus 130 is provided in order to elastically support the rack bar 120 in the direction of the pinion gear, i.e., to elastically push the rack bar 120 toward the pinion shaft 110. In the present invention, a plurality of rack bar supporting apparatuses 130 are provided, which have a smaller volume than those of the conventional art, thereby improving the supporting force and at the same time improving space efficiency by reducing the volume. The rack bar supporting apparatuses include a plurality of support yokes 170 disposed at a 90 degree angle relative to one another to exert partially opposed forces on the rack bar 120.

That is, in the present invention, a pair of rack bar supporting apparatuses 130 is provided on circumferential upper and lower parts of the rear of the rack bar 120. Each of them is tightly contacted with the rack bar 120 to prevent the circumferential rotation of the rack bar 120 and at the same time elastically support the rack bar 120 in the direction of the pinion shaft 110 by the resultant force of the rack bar supporting apparatuses 130.

Additionally, the pair of rack bar supporting apparatus 130 are provided at an inclined position from the rack bar 120 to thus be protruded relatively shortly to the rear of the housing 102. This can reduce the volume of the gear box 100, whereby only a small installation space is required, thus increasing the space efficiency.

Conventionally, in order to generate a predetermined supporting force, one support yoke has to be provided. This requires a large support yoke and a large installation space thereof. Moreover, since the support yoke is installed against the rear surface of the rack bar, it is protruded greatly to the rear of the rack bar.

On the contrary, in the rack bar supporting apparatus 130 of the present invention, two support yokes 170 smaller than the conventional one are installed against the rear surface of the rack bar 120. This shortens the length of protrusion to the rear, thereby making the volume of the rack bar supporting apparatus 130 and the volume of the gear box 100 compact.

This rack bar supporting apparatus 130 is formed integral with the housing 102 at the rear of the housing 102. It includes a pair of yoke cylinders 140 formed at circumferential both sides of the rear surface of the rack bar so that they can be opposite to each other, a yoke plug 150 for enclosing the yoke cylinder 140 at one end of the outer portion of the yoke cylinder 140 and a lock nut 151 for fixing the yoke plug 150.

The yoke cylinders 140 are provided on opposite sides of a plane of a resultant force exerted by the rack bar supporting apparatuses 130 on the rack bar 120, tending to push the rack bar 120 towards the pinion shaft 110.

Within the yoke cylinder 140 enclosed by the yoke plug 150 is installed a spring 160 whose one end being supported by the yoke plug 150. Between the spring 160 and the rack bar 120 is installed a support yoke 170 that is elastically supported by the spring 160 to the direction of the rack bar 120 and is slidably moved therein.

At this time, the yoke cylinders 140 each are inclined at 45 degrees at the upper and lower parts so that they can be opposite to each other from the direction of the force of contact between the rack bar 120 and the pinion shaft 110 in order to lead the resultant force of the support yokes 170 installed within the yoke cylinders 140.

Moreover, at the front end of the support yoke 170 is provided a contact groove 171 having a rounding to surround the rack bar 120. Between the contact groove 171 of the support yoke 170 and the rear surface of the rack bar 120 is installed a yoke seat 180 of a thin metal so that it can be tightly contacted with them.

Furthermore, at each of the support yokes 170 is provided a protuberance 172 protruded toward the rack bar 120. At the yoke seat 180 is provided a convex 181 into which the protuberance 172 is inserted and at the same time that is protruded toward the rack bar 120. This convex 181 is inserted into the rack bar 120. At both sides of the outer circumference of the rack bar 120 is formed a groove 122 for guiding the axial movement of the rack bar 120 and preventing the circumferential rotation thereof.

In the thusly constructed rack bar supporting apparatus for the vehicle steering system of the present invention, when a driver operates a steering wheel, the input shaft 103 connected thereto is rotated along with the pinion shaft 110 linked to the lower end thereof.

The teeth of the pinion gear 111 formed on the outer circumferential surface of the pinion shaft 110 mesh with the teeth of the rack gear 121 of the rack bar 120 disposed at the rear of the pinion gear 111, whereby the rack bar 120 is moved in the bilateral direction of a vehicle to thus operate wheels through tie rods linked to opposite ends of the rack bar 120.

At this time, a pair of support yokes 170 provided at the rack bar supporting apparatus 130 is tightly contacted to the rack bar 120 by their respective spring 160. Their supporting operation is carried out in the direction of the center of the rack bar 120, which is the direction of the resultant force of the support yokes 170, for thereby meshing the teeth of the rack gear 121 with the teeth of the pinion gear 111.

Meanwhile, when a vehicle travels on a bold road or a road with irregular surfaces, left and right wheels are operated respectively, whereby a rotation directional force is transmitted to the rack bar 120 linked to those wheels to generate rotation and torsion in the rack bar 120. The rack bar supporting apparatus 130 of the present invention is inclined to the upper and lower parts of the rear surface of the rack bar 120 in the circumferential direction. Thus each of the support yokes 170 generates a reaction force with respect to the rotation and torsion of the rack bar 120, for thereby preventing the rotation of the rack bar 120 and at the same time supporting the rear surface of the rack bar 120 by the resultant force of the support yokes 170.

Moreover, the protuberance 172, groove 122 and convex 181 formed respectively on the support yoke 170, rack bar 120 and yoke seat 180 are coupled with one another for thereby guiding the axial movement of the rack bar 120 and at the same time increasing the reaction force with respect to the rotation and torsion, thus preventing the rotation of the rack bar 120.

As explained above in detail, the present invention provides a pair of rack bar supporting apparatuses for generating a predetermined supporting force. Thus the volume of each rack bar supporting apparatus can be reduced and at the same time the rack bar supporting apparatus is inclined from the rear surface of the rack bar. This can greatly reduce the distance of protrusion toward the rear of the housing, whereby the rack bar supporting apparatus and the gear box can be made compact, the installation space can be reduced and the space efficiency can be increased.

Additionally, the rack bar supporting apparatuses are located symmetrically on circumferential upper and lower parts of the rear of the rack bar for thereby elastically supporting the rear surface of the rack bar in opposite directions. On the rack bar, the support yoke and the yoke seat located between them, a groove, a protuberance and a convex are formed respectively. This increases the reaction force with respect to the rotation and torsion of the rack bar for thereby preventing the rotation of the rack bar, whereby the smooth meshing between the pinion gear and the rack gear can be maintained for thereby preventing an excessive clearance between them, noise and abrasion.

What is claimed is:

1. A vehicle steering system comprising: a pinion shaft having a pinion gear on an outer circumference and installed within a housing; a rack bar located within the housing so as to cross the pinion shaft, said rack bar having a rack gear meshing with the pinion gear on one side of a middle part of the rack bar; and a plurality of rack bar supporting apparatuses provided at a rear surface of the rack bar for elastically supporting the rack bar in the direction of the pinion shaft, wherein the plurality of rack bar supporting apparatuses comprises: a pair of yoke cylinders spaced from each other by a predetermined angle in the circumferential direction on the rear surface of the rack bar, said yoke cylinders being enclosed at outer sides by respective yoke plugs; support yokes each installed within a respective one of the yoke cylinders; a plurality of springs each inserted between a respective one of the support yokes and a respective one of the yoke plugs, the support yokes having respective contact grooves for partially surrounding the rack bar at one end facing the rack bar; and yoke seats each installed between a respective one of the contact grooves and the rack bar.

2. The apparatus of claim 1, wherein the contact grooves of the support yokes are each provided with a protuberance protruded toward the respective one of the yoke seats, each said protuberance being inserted into one side of the respective yoke seat and a protuberance protruded toward the rack bar being provided at the other side of the respective yoke seat, the protuberances of the yoke seats being inserted into respective longitudinal grooves in the rear surface of the rack bar, the longitudinal grooves being formed on the rear surface of the rack bar in an axial direction to enable a smooth axial movement of the rack bar.

3. The apparatus of claim 1, wherein the yoke cylinders are formed integral with the housing and are inclined toward the housing from the center of the rack bar to reduce the distance of protrusion toward the rear of the housing.

4. The apparatus of claim 3, wherein the yoke cylinders are provided on opposite sides of a plane of a resultant force exerted by the rack bar supporting apparatuses on the rack bar, tending to push the rack bar towards the pinion shaft.

5. The apparatus of claim 4, wherein the yoke cylinders are inclined at 45 degrees on upper and lower sides relative to the plane of the resultant force exerted by the rack bar supporting apparatuses on the rack bar.

6. A vehicle steering system comprising:

a pinion shaft having a pinion gear on an outer circumference, said pinion gear being disposed within a housing;

a rack bar located within the housing so as to cross the pinion shaft, said rack bar having a rack gear meshing with the pinion gear on the rack bar; and a plurality of rack bar supporting apparatuses provided at a rear surface of the rack bar for elastically pushing the rack bar toward the pinion shaft, wherein the rack bar supporting apparatuses include a plurality of support yokes disposed at an angle relative to one another to exert partially opposed forces on said rack bars, wherein the support yokes are slidably disposed in respective yoke cylinders along an outer circumference of the rack bar, yoke plugs enclosing outer sides of respective ones of the yoke cylinders, a spring being inserted between each one of the support yokes and a respective one of the yoke plugs, the support yokes having respective contact grooves partially surrounding the rack bar at one end facing the rack bar, a yoke seat being installed between each one of the contact grooves and the rack bar.

7. The apparatus of claim 6, wherein the contact grooves of the support yokes are each provided with a protuberance extending toward the respective one of the yoke seats, each said protuberance being inserted into one side of the respective yoke seat and a protuberance extending toward the rack bar being provided at the other side of the respective yoke seat, the protuberances of the yoke seats being inserted into respective longitudinal grooves in the rear surface of the rack bar.

8. The apparatus of claim 6, wherein the yoke cylinders are formed integral with the housing and are inclined toward the housing from the center of the rack bar to reduce the distance of protrusion toward the rear of the housing.

9. The apparatus of claim 6, wherein the support yokes are inclined at 90 degrees relative to one another.

* * * * *